United States Patent [19]

Doughty, Jr. et al.

[11] 3,855,191

[45] Dec. 17, 1974

[54] POLYTETRAFLUOROETHYLENE MOLDING POWDERS OF TETRAFLUOROETHYLENE AND PERFLUORO (ALKYL VINYL ETHER) COPOLYMER

[75] Inventors: Thomas Russell Doughty, Jr., Philadelphia, Pa.; Carleton Angelo Sperati, Parkersburg, W. Va.; Howard Ho-Wei Un, Wilmington, Del.

[73] Assignee: E. I. du Pont de Nemours and Company, Wilmington, Del.

[22] Filed: Apr. 4, 1973

[21] Appl. No.: 347,548

[52] U.S. Cl. ...... 260/87.5 A, 260/42.18, 260/92.1 R
[51] Int. Cl. ............................................. C08f 15/02
[58] Field of Search ............................ 260/87.5 A

[56] References Cited
UNITED STATES PATENTS 3,142,665 7/1964 Cardinal et al. ............... 260/92.1
3,245,972 4/1966 Anderson et al. ............... 260/92.1

FOREIGN PATENTS OR APPLICATIONS 1,116,210 6/1968 England ..................... 260/87.5 A Primary Examiner—Stanford M. Levin

[57] ABSTRACT

When a perfluoro(alkyl vinyl ether) such as perfluoro(propyl vinyl ether) is copolymerized with tetrafluoroethylene in the presence of 3 to 200 ppm. of telogenically inactive fluorinated dispersing agent, the resultant copolymer molding powder containing 0.02 to 0.26% by wt. of the vinyl ether comonomer has a low amorphous content, i.e. no greater than 8%, relative to the proportion of vinyl ether comonomer that is present. The combination of low amorphous content and vinyl ether units in the polymer results in the copolymer molding powder having the remarkable combination of high resistance to creep and high toughness without sacrifice in thermal stability and suitability for molding by the preform/free sinter fabrication technique.

5 Claims, 1 Drawing Figure

EFFECT OF DISPERSING AGENT ON AMORPHOUS CONTENT OF TETRAFLUOROETHYLENE / PERFLUORO (ALKYL VINYL ETHER) COPOLYMER

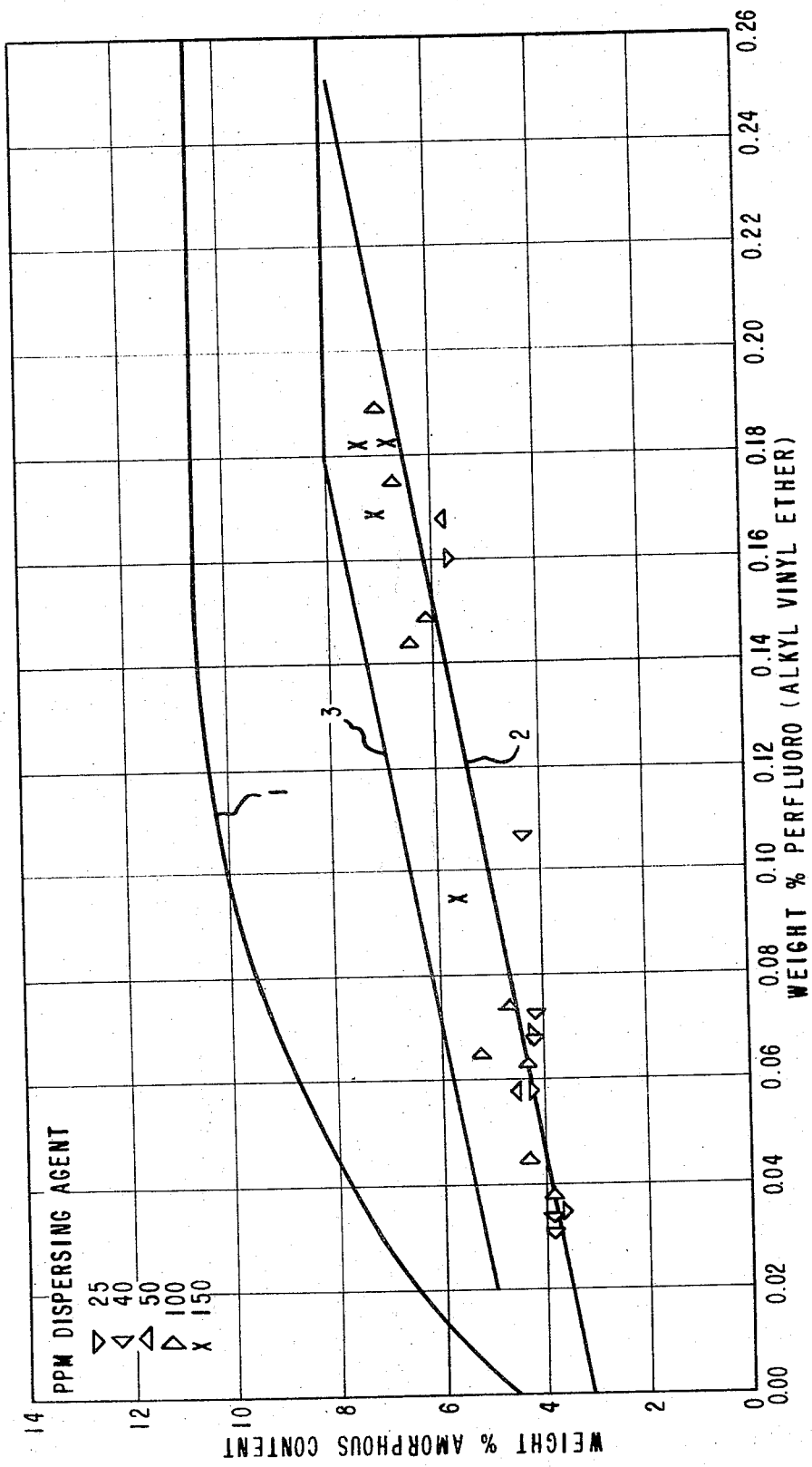

POLYTETRAFLUOROETHYLENE MOLDING POWDERS OF TETRAFLUOROETHYLENE AND PERFLUORO (ALKYL VINYL ETHER) COPOLYMER

This invention is directed to improved polytetrafluoroethylene molding powders in which a small proportion of a perfluoro (alkyl vinyl ether) is present.

U.S. Pat. No. 3,331,822 to Kometani et al. discloses polytetrafluoroethylene molding powders in which from 0.1 to 10 wt.%, preferably 0.5 to 2.0 wt. %, of hexafluoropropylene or perfluorobutene-1 is present copolymerized with the tetrafluoroethylene, this small proportion of comonomer serving to increase the bulk density and improve the flow character of the powder over polytetrafluoroethylene homopolymer.

U.S. Pat. No. 3,655,611 to Mueller et al. discloses polytetrafluoroethylene molding powder in which 0.05 to 0.5 mole %, preferably from 0.1 to 0.5 mole %, of hexafluoropropylene is present as a copolymer with the tetrafluoroethylene, obtained by maintaining a constant predetermined ratio between hexafluoropropylene and tetrafluoroethylene during the polymerization process, to obtain a molding powder of improved resistance to cold flow, which can be called creep. The patent is more descriptive of the general properties of the molding powder than U.S. Pat. No. 3,331,822 and this description points up a disadvantage of the hexafluoropropylene comonomer. Specifically, thermal stability of the copolymer at 380°C. decreases with increasing hexafluoropropylene content. In Table II, thermal stability (defined as no visual deformation or blistering) is noted for molding powders containing from 0.23 – 0.36 mole % hexafluoropropylene and instability is noted for higher hexafluoropropylene contents. Thermal instability, however, manifests itself in ways, e.g., mechanical properties, which are not visually observable. In addition, the use of higher sintering tempratures than 380°C. which often occurs intentionally or by accident in commercial operations aggravates the thermal instability caused by the presence of the hexafluoropropylene comonomer.

British Pat. No. 1,116,210 discloses polytetrafluoroethylene molding powders in which from 0.0003 to 1.5 mole % of a compound of the formula $CF_2=CF-X$ wherein X is perfluoroalkyl, omega-hydroperfluoroalkyl, oxyperfluoroalkyl, and polyether homologues of oxyperfluoroalkyl, and perfluoro-2-methylene-4-methyl-1,3-dioxolane, is present copolymerized with the tetrafluoroethylene. The copolymer particles as polymerized are spheroidal, giving them improved powder flow without the need for cutting to eliminate long (irregular shaped) particles. This patent discloses another effect of the comonomer on the copolymer making up the molding powder, namely that the copolymer exhibits low percent crystallinity, which makes the copolymer molding powder extremely useful in the ram extrusion method of fabrication. In ram extrusion, the molding powder is rammed through a heated barrel and die which sinters the compacted molding powder under pressure as it passes through the die. Low percent crystallinity, or conversely, high percent amorphous content, is an important property to ram extrusion, because it permits better compaction of successive charges of the molding powder to the ram extruder into a continuous sintered ram extrudate. The lower the amorphous content of the molding powder, the greater is the tendency of the extrudate to come apart in the planes where successive charges of the molding powder have met. This phenomenon is called "poker chipping."

While the effect of hexafluoropropylene and vinyl ether comonomers to increase amorphous content is beneficial to the ram extrusin application of the resin, it is deleterious to the preform/free sinter type of fabrication which is of greater importance in terms of proportion of molding powder fabricated by this method versus the ram extrusion technique. In the preform/free sinter technique, the molding powder is compacted in a mold to the shape desired, and the resultant preform is removed from mold and then heated without the application of any external pressure to a temperature which sinters the preform. Other factors being equal the more dense the preform, the more dense and stronger is the sintered product thereof. The increased amorphous content of the resin caused by the presence of the above-described comonomers, however, decreases the tensile strength and elongation of the sintered resin. It is believed that the presence of the comonomer influences the strength of the sintered part by influencing the elastic memory of the resin. Thus after preforming, removal from the mold, and heating to sinter without pressure, the deformed particles in the preform tend to recover their original shape and the preform expands, thereby losing some of its compactness, which results in reduced mechanical properties for the sintered preform.

The present invention provides a polytetrafluoroethylene (PTFE) molding powder which has at least the improved creep resistance disclosed in Mueller et al. but without the adverse effect on thermal stability experienced therein and without the magnitude of the increase in amorphous content disclosed in the aforesaid British patent and yet surprisingly high toughness. Specifically, the molding powder consists essentially of a copolymer of tetrafluoroethylene with from 0.02 to 0.26% by wt. of perfluoro(alkyl vinyl ether) in which the alkyl group contains from 1 to 5 carbon atoms, the copolymer having a maximum amorphous content which is related to the vinyl ether content of the copolymer by the equation: (1) Wt. % Amorphous Content = (18.4 × wt. % vinyl ether)+4.6, with the proviso that the amorphous content is no greater than 8% by wt.

While the vinyl ether comonomers used in the present invention are the same as used in the aforesaid British patent, the magnitude of the increase in amorphous content caused by the presence of the comonomer as reported in the patent, does not occur in the copolymer molding powder of this invention.

The lesser effect of the comonomer in the present invention on amorphous content arises from the unique process used to make this composition. Specifically, as compared to the aforesaid British patent, in the proces of pressuring tetrafluoroethylene into an agitated aqueous medium that contains the vinyl ether and dissolved free radical polymerization initiator under polymerization conditions of temperature and pressure to form polytetrafluoroethylene molding powder, the improved molding powder of the presennt invention is made by conducting the copolymerization in the presence of from 3 to 200 ppm. of telogenically inactive fluorinated dispersing agent dissolved in the aqueous medium, based on the weight of water in the medium. As compared to the process for making PTFE homopolymer, the improvement step in the process involves the combination of conducting the polymerization in the presence of both the dispersing agent and the vinyl ether comonomer.

The accompanying drawing is a graph of the variation of amorphous content of the copolymer with increasing perfluoro(alkyl vinyl ether) content with and without dispersing agent. The upper curve 1 represents the variation obtained when no dispersing agent is present during copolymerization. The lower curve 2 represents the variation obtained when dispersing agent is present during copolymerization. It will be noted that both curves show an increase in amorphous content with increasing vinyl ether content, but the lower curve representing the copolymer molding powder of this invention shows a more attractive (lower) percent amorphous content through the composition region of interest. Generally, it is desired that the amorphous content of copolymers of the present invention be no more than two-thirds of the amorphous content of the corresponding copolymer (same vinyl ether comonomer) made without dispersing agent. The relationship between maximum amorphous content and vinyl ether content set forth in equation (1) generally satisfies this degree of improvement through the preferred vinyl ether content range of 0.03 to 0.16 % by wt. Curve 3 in the drawing is the curve represented by equation (1) subject to a maximum amorphous content of 8% by wt.

The use of such dispersing agent in a system for copolymerizing tetrafluoroethylene and perfluoroolefin or perfluoro(alkyl vinyl ether) to a different type of polytetrafluoroethylene, viz an aqueous dispersion (or fine powder type) of polytetrafluoroethylene, is disclosed in U.S. Pat. No. 3,142,665 to Cardinal et al. In the aqueous dispersion type of polymerization system, dispersing agent is present, usually at least 1000 ppm, based on water present, and the stirring is sufficiently slow that the polymer forms in particles from 0.1 to 1.0 micron diameter which remain dispersed in the aqueous medium after polymerization is stopped. Upon coagulation and drying, the resultant copolymer fine powder can be mixed with lubricant and paste extruded at room temperture. The small proportion of perfluoroolefin or perfluoro(alkyl vinyl ether) comonomer in Cardinal et al. functions to make the fine powder more paste extrudable, but not melt fabricable so that the copolymer fine powder is similar to polytetrafluoroethylene homopolymer fine powder in this respect.

As is well-known, the fine powder type of polytetrafluoroethylene is not ram extrudable and is not fabricable into articles of any significant mass or thickness by the preform/free sinter technique. Conversely, polytetrafluoroethylene molding powder, sometimes called the "granular" type of polytetrafluoroethylene with which the present invention is concerned, is not paste extrudable.

In the granular polymerization process, dispersing agent is not used for the purpose of keeping the polymer particles dispersed throughout the reaction, because the process is conducted under sufficient agitation to cause the particles to coagulate as they are formed, with the result being the formation of large polymer particles, sometimes 1000 microns in diameter and larger.

However, an unusual role for dispersing agent in the granular polymerization process has been developed, as described in U.S. Pat. No. 3,245,972 to Anderson et al., wherein it is disclosed that from 50 to 500 ppm. of telogenically inactive fluorinated dispersing agent present at the start of the polymerization reaction produces solid nuclei which lead to the ultimate formation of polytetrafluoroethylene molding powder of increased specific surface area which gives improved moldability. Various copolymerizable monomers such as hexafluoropropylene, n-perfluoropropyl perfluorovinyl ether, vinylidene fluoroide, and chlorotrifluoroethylene are disclosed as alternative but less preferred sources for the requisite number of nuclei.

In the present invention the dispersing agent performs the additional and surprising function of modifying the detailed mechanism by which the monomers are incorporated into the growing particle so that a more nearly perfect order (i.e. low amorphous content) is achieved, as compared to the decrease in the ordered arrangement of these molecular building blocks with resulting higher amorphous content in the aforesaid British patent.

Any of the telogenically inactive fluorinated dispersing agents used in aqueous dispersion polymerization of tetrafluoroethylene to keep the polymer particles dispersed in the aqueous polymerization medium throughout polymerization can be used in the present invention. Of course, the dispersing agents are all water soluble at conditions ranging from polymerization conditions to room temperature and atmospheric pressure. Preferred dispersing agents are the anionic dispersing agents such as perfluoro- and omega- hydroperfluoroalkanoic acids of the formula $B(CF_2)_nCOOH$ wherein $n$ is an integer of from 6 to 12 and B is H or F, and the alkali metal and ammonium salts thereof. Among this group, the ammonium salts of the acids which contain from 8 to 10 carbon atoms are especially preferred. Examples of specific dispersing agents include 3,6-di-oxa-2,5-bis-(trifluoromethyl)-undecafluorononanoate, ammonium omega hydrohexadecafluorononanoate, and ammonium perfluorooctanoate.

The presence of the dispersing agent during the copolymerization reaction is obtained by charging all the dispersing agent to the aqueous polymerization medium prior to commencement of polymerization reaction or by metering the dispersing agent to the medium at the start and during the polymerization. Usually from 5 to 75 ppm. of dispersing agent is adequate to give significant improvement in the ultimate amorphous content of the copolymer and more usually 10 to 40 ppm. of the dispersing agent will give such improvement. The ppm. amounts of dispersing agent disclosed herein are parts by weight per million parts by weight of water present in the aqueous medium.

The aspect of the process of pressuring tetrafluoroethylene into an agitated aqueous solution of free radical initiator to cause polymerization is conventional. Typical conditions include polymerization temperatures of 50° to 100°C. and tetrafluoroethylene pressures of 10 to 50 kg/cm². Examples of initiators include redox systems, azo initiators, organic and inorganic peroxides, with the inorganic persulfates, especially ammonium persulfate, being preferred. The amount of initiator used will depend on the particular initiator used and the polymerization temperature used. Buffer can be dissolved in the aqueous medium to maintain the pH of the aqueous medium towards or at a basic pH to minimize corrosion of the polymerization vessel. The benefits of programmed addition of buffer or even omission of buffer are disclosed in U.S. Pat. No. 3,629,219 to Esker.

The presence of the perfluoro(alkyl vinyl ether) comonomer during the polymerization reaction is obtained by adding all the vinyl ether to the aqueous medium prior to commencement of the polymerization reaction or by adding some at the start and metering the remainder to the reaction such as at a rate that provides a constant polymerization environment while the reaction is occurring. The amount of vinyl ether added will depend on the proportion desired in the final copolymer and on the reactivity of the particular vinyl ether used, the reactivity of all being less than of the tetrafluoroethylene. The preferred vinyl ethers are those which are straight-chained and also those in which the perfluoroalkyl group contains from 1 to 3 carbon atoms. The vinyl ether comonomer is incorporated into the copolymer chain in random fashion by polymerization through the unsaturated group of the vinyl ether.

In contrast to the spheroidal copolymer particles obtained from the polymerization in the aforesaid British patent, the copolymer particles observed for the molding powders of the present invention are irregular and stringy in shape.

The resultant polytetrafluoroethylene molding powder is especially useful to mold articles by the preform/free sinter technique, which articles exhibit the combination of high resistance to creep, high thermal stability, and high toughness over prior art tetrafluroethylene homopolymer and copolymer molding powders. For most molding applications, it will be desirable to subject the coarse molding powder obtained from copolymerization to fine grinding to an average particle diameter of from 10 to 100 microns by means well-known in the art. Powder flow of such fine ground molding powder can be improved by agglomerating the powder to agglomerate sizes generally from 300 to 800 microns using water, organic solvent, or a mixture thereof as described in British Pat. No. 1,033,638, U.S. Pat. Nos. 3,265,679, and 3,527,857, respectively, as an agglomeration medium.

The amorphous content of the copolymer is determined by calculation from measurement of the ratio of the infrared absorbances at 12.85 microns (778 cm$^{-1}$) and 4.25 microns (2353 cm$^{-1}$) on coarsely ground copolymer (average particle diameter greater than 100 microns). As shown by Moynihan, J. Am. Chem. Soc., 81,1045-50(1959), the 12.85 micron absorbance is directly proportional to the weight percent amorphous content. Since the 4.25 micron absorbance is essentially independent of voids or changes in crystallinity, the ratio is nearly directly proportional to weight percent amorphous. Using a Perkin Elmer Model 21 infrared spectrophotometer, calibrated with samples of known amorphous content, the following equation serves to permit calculation of weight percent amorphous content.

Wt. % Amorphous = $30.26 \times A_{12.85}/A_{4.25} + 1.73 \times (A_{12.85}/A_{4.25})^2$ Preferably, the amorphous content is no greater than 6.5% by wt. based on the total weight of the copolymer.

It is important to distinguish between the amorphous content of an unsintered molding powder and the amorphous content of a sintered molding. The amorphous content of the unsintered molding powder is determinative of the soundness of the article that can be molded from the molding powder. Upon sintering and cooling, the article undergoes recrystallization and this new crystallinity, of the sintered article, is independent of the unsintered amorphous content. Unless indicated otherwise, the amorphous contents disclosed herein are on unsintered molding powder.

Standard specific gravity (SSG) of the molding powder is measured by water displacement of a standard molded test specimen in accordance with ASTM D1457-69. The standard molded part is formed by preforming 12.0 g. of the molding powder in a 2.86 cm. diameter die at a pressure of 352 kg./cm.$^2$, followed by the sintering cycle of the preform of heating from 300° to 380°C. at 2°C./min., holding at 380°C. for 30 minutes, cooling to 295°C. at 1°C./min. and holding at this temperature for 25 minutes, after which the specimen is cooled to room temperature and tested for specific gravity.

Inherent polymer density can be determined on a test specimen prepared as described in the preceding paragraph by microtoming a piece of film 75 microns thick from the center of the molding. An infrared scan is run on the specimen and the ratio of the absorbance at 12.85 microns to that at 4.25 microns is calculated. The inherent polymer density is determined from the calibration curve of the infrared ratio versus the inherent polymer density established for the specific instrument used.

Percent crystallinity (by wt.) of the molding powder can be determined by subtracting the percent amorphous content (by wt.) from 100 or from the inherent polymer density determination in accordance with the equation.

Crystallinity (wt. %) = 762.25-(1524.5/inherent polymer density)

The vinyl ether content of the molding powder of the present invention can be determined by material balance, calculating the ether monomer content from the amount fed to the polymerization reactor minus the amount remaining in the reactor after polymerization is complete. An infrared analysis procedure is also available.

A test specimen approximately 0.5 mm. thick (variation from 0.43 to 0.89 is acceptable) is prepared by pressing 0.7 g. of the copolymer molding powder in a die 2.86 cm. in diameter with polished faces and at ambient temperature and a pressure of 700 kg./cm$^2$ for 1 minute. The ratio of the absorbance at 10.05 microns (995 cm.$^{-1}$) to the absorbance at 10.70 microns (935 mc.$^{-1}$) is determined from the infrared scan. In practice, the specimen is scanned with a Perkin-Elmer Model 21 instrument from 9.6 to 11.4 microns. The response of the instrument is set by adjusting the 100 percent control or inserting a screen in the reference beam so that an absorbance of about 0.1 is recorded at 9.6 microns. A straight base-line is drawn from 9.9 to 11.25 microns and the ratio between the absorbance at 10.05 to the absorbance at 10.7 is calculated. The weight percent of perfluoro(propyl vinyl ether) is then read from a calibration plot of weight percent PPVE versus the ratio. This plot can also be expressed by the equation:

Wt. % PPVE = $0.152 (A_{10.05}/A_{10.70}) - 0.023 (A_{10.05}/A_{10.70})^2$

The calibration plot is established with a series of copolymer samples having a range of combined comonomer contents and prepared according to the molding procedure described above. On these films the absorbance at 10.05 microns and thickness of each specimen are recorded along with the value of each ratio, $A_{10.05}/A_{10.70}$. The weight percent PPVE determined from the equation below for each specimen is then plotted against the ration $A_{10.05}/A_{10.70}$ for that specimen. The equation for wt. % PPVE above is determined by least squares regression analysis of the data used to prepare the plot.

Wt. % PPVE = $(100\ A_{10.05})/1497 \times$ thick (cm.) $\times 2.2$

The value of 1497 was previously determined as the absorptivity of PPVE homopolymer dissolved in a mixture of the isomers of perfluoro(dimethylcyclobutane), and assuming Beer's law, which was found to hold for the solutions of the homopolymer of PPVE used for calibration, also holds for the copolymer system. The 2.2 factor in this equation is taken as the density in g/cc of the copolymer films used.

The approximate weight percent of perfluoro (methyl vinyl ether), (PMVE), is also determined by infrared analysis. The characteristic absorption peak for this comonomer is at 11.25 microns (889 cm.$^{-1}$) where there are interferences from polytetrafluoroethylene absorption. Compensating films of the same thickness made from the copolymer with PPVE are, therefore, used, and the measured thickness of the test specimen is used in the calculation rather than use of a ratio with an absorption due to thickness. The absorptivity value of 115 in the equation was determined on a solution of the homopolymer of PMVE in a low molecular weight oil made from hexafluoropropylene epoxide, with a correction calculated from results of material balance polymerizations that established the maximum amount of PMVE available for incorporation into the polymer.

weight percent PMVE
$$= \frac{100\ (\text{absorbance at }11.25\text{ microns})}{115 \times \text{thickness (cm.)} \times (\text{density of copolymer})}$$

The weight percents of vinyl ether comonomer disclosed herein refer to the weight percent of such comonomr present in the copolymer based on the total weight of the copolymer.

Flexural creep modulus is determined on a bar 1.27 cm wide cut from a molding made in a manner similar to the ASTM tensile plaque but using 29 instead of 14.5 grams of powder. The bar is mounted to give a span of 5.08 cm. supported at each end and weighted in the center with a dead weight load adjusted to give a stress of 1,000 psi (70 kg./cm.$^2$). The deflection of the bar is followed as a function of time at room temperature. From the deflection of a strain is calculated and from this the flex creep modulus is calculated as the stress divided by the strain at time, $t$. The value reported is the creep modulus at 100 hours under 70 kg./cm.$^2$ stress.

When the desired time has elapsed, the load is removed and recovery followed as a function of time. The percent unrecovered strain is determined from the minimum deflection observed during the recovery. In general, the recovery is followed for a time period comparable to that used originally for the creep test.

Tensile impact strength is determined according to ASTM specification D-1822. Test specimens in general were cut from the same tensile plaque used to measure tensile strength properties. Tensile strength is determined according to ASTM D 1457-69.

Melt viscosity is calculated by measuring the tensile creep of a sintered piece held at 380°C. Specifically, 12 g. of molding powder is placed in a 7.6 cm. diameter mold between 0.152 cm. rubber cauls and paper spacers. The mold is then heated at 100°C. for 1 hour. Pressure is then slowly applied on the mold until a value of 140.6kg./cm.$^2$ is obtained. This pressure is held for 5 minutes and then released slowly. After the sample disc is removed from the mold and separated from the cauls and paper spacers, it is sintered at 380°C. for 30 minutes. The oven is then cooled to 290°C. at a rate of about 1°C. a minute and the sample is removed. A crack-free rectangular sliver with the following dimensions is cut: 0.152 to 0.165 cm. wide, 0.152 to 0.165 cm. thick, and at least 6 cm. long. The dimensions are measured accurately and the cross-sectional area is calculated. The sample sliver is attached at each end to quartz rods by wrapping with silver-coated copper wire. The distance between wrappings is 4.0 cm. This quartz rod-sample assembly is placed in a columnar oven where the 4 cm. test length is brought to a temperature of 380° ± 2°C. A weight is then attached to the bottom quartz rod to give a total weight suspended from the sample sliver of about 4 g. The elongation measurements vs. time are obtained, and the best average value for the creep curve in the interval between 30 and 60 minutes is measured. The specific melt viscosity, which may be better called apparent melt viscosity, is then calculated from the relationship $$\eta_{app} = (WL_{t\ o})/3(d^L{}_T/dt)A_T$$

where $\eta$app = (apparent) melt viscosity in shear, poises
W = tensile load on sample, g
$L_T$ = length of sample (at 380°C.) cms. (4.32 cm)
g = gravitational constant, 980 cm./sec.$^2$
$(dL_t/dt)$ = rate of elongation of sample under load = slope of elongation vs. time plot, cm./sec.
$A_T$ = cross-sectional area of sample (at 380°C.), cm$^2$ -area increases 37% at 380°C. over that at room temperature The copolymer molding powders of the present invention are high in molecular weight as indicated by their lack of fabricability by melt flow processes such as melt extrusion or injection molding. Generally, the molding powders have an apparent melt viscosity of at least 1 × 10$^9$ poises at 380°C.

Examples of the present invention, in which parts and percents are by weight unless otherwise indicated, are as follows;

EXAMPLE 1

A series of polymerizations is carried out in a 7.6 liter stainless steel vertical autoclave. Five liters of a solution of doubly distilled water and 8000 ppm. ammonium carbonate buffer, ammonium persulfate initiator, and ammonium perfluorooctanoate dispersing agent are charged to the autoclave. The vessel is then evacuated, charged with tetrafluoroethylene (TFE) and evacuated. The evacuation and charging steps are repeated a total of 3 times to remove oxygen. After the final evacuation, the perfluoro(propyl vinyl ether) is charged to the system through a rubber septum using a syringe to measure closely the volume of vinyl ether added. The aqueous charge is then agitated using a 2 bladed, flat paddle agitator turning at 750 rpm. Hot water is circulated through the autoclave jacket until the temperature of the charge reaches 65°C. TFE is then added until the pressure is brought up to 17.5 kg./cm.² gauge. After a few minutes, there is a pressure drop to 16.8 kg./cm.² gauge, signaling the start of the reaction. TFE is then fed continuously to maintain a pressure within the reaction vessel of 17.5 kg./cm.² gauge. The monomer feed is stopped after reacting to 23 percent solids based on the weight of the aqueous medium. The reaction is allowed to continue until the pressure falls to a few atmospheres. The pressure is then released and the polymerized product discharged. Typical polymer made this way has a specific melt viscosity of at least $1 \times 10^9$ poises at 380°C.

The slurry is dewatered, and a 300 g. sample in 2600 ml. water is cut in a Waring blender at medium speed for one minute. This slurry is then dewatered and the polymer placed in a cloth covered aluminum pan. The pan is placed in a 125°C. air circulating oven to dry overnight.

Using the above general procedure, several series of copolymer molding powders were made in which the amount of perfluoro(propyl vinyl ether) (PPVE) charged to the autoclave was varied to give varying amounts of comonomer ranging from 0.03 to 0.19% by wt. incorporated into the polymer. In additioon, the amount of added ammonium perfluorooctanoate was varied from 25 to 150 ppm. based on the amount of water charged. For comparison, a series of polymerizations was also made in which the amount of PPVE was varied in the absence of ammonium perfluorooctanoate and in which PPVE was omitted entirely. Results of these experiments are shown as the curves of the graph of the accompanying drawing. Lower curve 2 is the composite curve for dispersing agent concentration of from 25 to 150 ppm., the individual curves being statistically indistinguishable from one another. Upper curve 1 is for the corresponding copolymer compositions in which no dispersing agent was added to the polymerization range.

It is clear from this graph that all of the copolymers produced inpolymerizations containing at least 25 ppm. of ammonium perfluorooctanoate have much lower amorphous contents than the polymers made without the concurrent use of ammonium perfluorooctanoate. Example 12 shows similar improvement (lower amorphous content) even when smaller proportions of dispersing agent are used.

EXAMPLE 2

This example illustrates the improved mechanical properties arising out of low amorphous content copolymer molding powder. The tensile properties of PTFE molding powder provide an excellent way to appraise the soundness of moldings, which, in turn, reflects the fabricability. To illustrate this sinterability of the powder, moldings were made essentially by the preform/free sinter technique of ASTM D1457 except that the sintering cycle included heating the specimen from 300°C. to 380°C. at 2°C./min. and holding it at 295°C. for 25 minutes at the end of the controlled cooling cycle. A copolymer made by the procedure of Example 1 with 40 ppm. of ammonium perfluorooctanoate and containing 0.072 wt. percent of perfluoro(propyl vinyl ether) had a tensile strength of 264kg./cm.² and an ultimate elongation of 350 percent. The comparative copolymer made without dispersing agent and containing 0.076 wt. percent of perfluoro(propyl vinyl ether) had a tensile strength of only 126 kg./cm.² and 200 percent ultimate elongation. The copolymer made with dispersing agent had an amorphous content of 4.1% and the copolymer made without dispersing agent had an amorphous content of 9.0%, showing the profound adverse effect of increased amorphous content on mechanical properties of articles made by the preform/free sinter technique.

In another comparison, two copolymers made with 100 ppm. of the same dispersing agent and containing 0.150 and 0.145 weight percent of perfluoro(propyl vinyl ether) respectively, the remainder being tetrafluoroethylene, had tensile strengths of 305 kg./cm.² and 400 percent ultimate elongation and 296 kg./cm.² and 450 percent ultimate elongation, respectively. The amorphous contents of these copolymers were 6.1 and 6.4 % by wt., respectively. The comparative polymer, made without dispersing agent, containing 0.155 weight percent of perfluoro(propyl vinyl ether) had an amorphous content of 10.5% by wt., a tensile strength of only 205 kg./cm.² and 340 percent ultimate elongation.

EXAMPLE 3

In a larger scale polymerization conducted according to the present invention, a stirred autoclave was charged with 757 parts of water at 65°C. One hundred thirty-two parts by weight of ammonium persulfate per million parts by weight of water (ppm.), 859 ppm. of ammonium carbonate and 11.0 ppm. of ammonium perfluorocaproate were also added to the water charge. The free space above the charge was then evacuated and 0.459 parts by weight of perfluoropropyl vinyl ether was charged to the autoclave. Thereafter the charge was pressured with tetrafluoroethylene and allowed to react at 65°C. and 15.8 kg./cm.² gauge pressure with 600 rpm. stirring rate until 36 percent of solids was produced. A 45°pitched-paddle, two blade agitator was used. At the end of the run the pressure was relieved and aqueous slurry containing product in a granular form was discharged. The raw polymer was cut by passing a water slurry through a commercially available model K– Fitz Mill with a No. 1B screen (1.25 mm. openings) run at 600 rpm. The polymer was heated with stirring in an aqueous slurry for 2 hours at 50°C. and dried in a pneumatic dryer with a 180°C. inlet temperature. The dry polymer was comminuted as described in example 11.

The finely divided resin has an apparent melt viscosity of $0.1 \times 10^{10}$ poises at 380°C., a standard specific gravity of 2.1745 and contained 0.082 weight percent (0.032 mole %) of PPVE. Amorphous content was 5.8% by weight determined as described hereinbefore. The following Examples 4 to 8 illustrate the improvement of the copolymer molding powders of the present invention over PTFE homopolymer molding powders.

EXAMPLE 4

This example shows the improved fabricability of the molding powders of the present invention. A series of 12 g. moldings was made from the copolymer of Example 3 using a die of 2.86 cm. diameter. Separate moldings were made at preform pressures of 14, 35, 70, 140 and 350 kg./cm.² preform pressure. The preforms were sintered and cooled by the SSG sintering cycle. Specific gravities of each sample were determined as specified in ASTM D-1457-69. A piece of film 75 microns thick was cut from the center of the test specimen and used to measure amorphous content by infrared analysis. From the infrared amorphous content, the inherent polymer density was determined and the void content calculated by the equation below.

$$\text{Percent voids} = 100 \times \frac{\text{inherent polymer density} - \text{measured specific gravity}}{\text{inherent polymer density}}$$

Moldings were made and tested as above using commercially available PTFE homopolymer molding powder (ASTM Type IV). The % voids calculated at the various molding pressures were as follows:

Table I

| Preform Pressure kg./cm.$^2$ | Copolymer | % Voids Homopolymer |
|---|---|---|
| 14 | 4.1 | 7.8 |
| 35 | 0.6 | 3.5 |
| 70 | 0.1 | 0.8 |
| 140 | 0.05 | 0.3 |
| 350 | 0.05 | 0.2 |

The lower void contents for the copolymer test specimens show up as improved mechanical and electrical properties in sintered moldings.

EXAMPLE 5

This example shows the decreased sensitivity of copolymers of this invention to cooling rate after sintering. Since the cooling rate is a major variable in determining the crystallinity of the sintered molding, productivity in fabricating large objects from PTFE is limited by the slow cooling needed to provide a uniform thermal environment. Twelve gram moldings were made at 350 kg./cm.$^2$ preform pressure from the copolymer of Example 3. The sintering was carried out in a manner similar to that described in Example 4 except that after 30 minutes at 380°C. the oven was turned off and allowed to cool with no added control. The cooling rate was about 2°C./min during the time the temperature was between 340° and 300°C. In a related experiment a cooling rate of 0.1°C./min. was used. To provide comparative data a commercially-available finely-ground homopolymer with a standard specific gravity of 2.175, very close to that of the copolymer, was molded, sintered, and cooled in the same fashion. Table II shows the crystalline content and specific gravity results of these experiments.

TABLE II

Effect of Cooling Rate on Development of Crystallinity After Sintering

| | Cooling Rate | | | | Delta SG |
|---|---|---|---|---|---|
| | 2°C./min. | | 0.1°C./min. | | (0.1°C. - 2°C.) |
| | SG | % C | SG | % C | ΔSG |
| Copolymer | 2.1688 | 59.3 | 2.1814 | 63.4 | 0.0126 |
| Homopolymer | 2.1722 | 60.4 | 2.1905 | 66.3 | 0.0183 |

It is desirable to have as small a difference in crystalline content as possible between rapid- and slow-cooled samples. This is shown as delta specific gravity (ΔSG) in the table. The data in Table II show that the ΔSG value is about 50% higher for the homopolymer resin than for the copolymer of this invention.

EXAMPLE 6

This example shows the decreased effect of thermal overexposure during sintering on copolymers of the present invention. In practical situations, ovens used for sintering PTFE tend to lose calibration after extended periods of operation at high temperatures. It is not unusual, therefore, for losses to be incurred to a manufacturer due to inadvertent overheating of a polymer with resultant major change in physical properties of the molding. The tensile strength behavior of PTFE is a well-established criterion for quality. Among the many values that can be obtained from a stress-strain curve, and an important characteristic, is the value of the tangent to the curve measured just prior to the point of failure. Moldings for tensile strength determination were made using the tensile plaque described in ASTM D-1457-69. The copolymer of Example 3 was preformed at 350 kg./cm.$^2$ and sintered for 30 minutes at 380°C. according to the schedule described above for SSG. For comparison, the homopolymer used for a control in Example 4 was also preformed and sintered in the same manner. Additional specimens of each resin were prepared and sintered under conditions where the specimen was maintained for 12 hours at 400°C. and for 24 hours at 400°C. Table III shows the values of the tangent to the stress-strain curve at rupture for the moldings.

TABLE III

Properties of Modified Resin After Thermal Exposure
Tangent Modulus at Rupture (kg./cm.$^2$ per 100% Elongation)

| Resin | 30 Min. at 380°C. | 12 Hours at 400°C. | 24 Hours at 400°C. |
|---|---|---|---|
| Homopolymer | 96 | 44 | 41 |
| Copolymer | 78 | 81 | 97 |

The copolymer of this invention provides a greater stability against change in properties, i.e., retained mechanical properties, after those extreme thermal cycles.

EXAMPLE 7

This example shows the improved toughness of copolymers of the present invention. The tensile impact strength values of plastics provide a useful indication of an important kind of toughness property. It has been known for many years that PTFE resins have excellent performance in this characteristic but that the values decrease with increasing crystalline content. ASTM tensile plaques were made from the copolymer used in Example 3 and the control polymer used in Example 4. The sintering cycle used was similar to the SSG cycle except that the cooling rate was 0.1°C./min. to simulate the thermal exposure used in cooling a large billet. The copolymer had a tensile impact strength of 1200 kg. cm./cm.$^2$ as compared to only 322 kg. cm./cm.$^2$ for the homopolymer.

EXAMPLE 8

For PTFE homopolymer, increasing crystallinity produces contradictory effects on certain mechanical properties, namely resistance to creep increases, but toughness decreases. The copolymers of the present invention exhibit both high creep resistance and high toughness. Values for flex creep modulus after 100 hours at 70 kg./cm.² were measured for the copolymer of Example 3 of the present invention. At a crystallinity (sintered molding) of 67%, the copolymer exhibits a creep modulus of 4000 kg./cm.² as compared to 3020 kg./cm.² for the homopolymer. At the same time, the tensile impact strength of the copolymer was above 1390 kg. cm./cm.² compared to 999 kg. cm./cm.² for the homopolymer. As the crystallinity of the homopolymer increases, by using a slower cooling rate after sintering, creep modulus increases but toughness decreases.

EXAMPLE 9

11.45 kg. of the copolymer of Example 3 was cooled and added to a mixing device known commercially as a 28.3 l. Patterson-Kelley Processor. 2.1 kg. of glass fiber identified as Owens Corning Fiberglas 709A one thirty-second of an inch milled fibers was added to the resin in the mixer. The batch was mixed for 5 minutes while running the intensifier bar and with the V-cone shell rotating at 24 rpm. The equipment was opened and the material on the sides of the mixer was scraped into the main body of the mass. Mixing was continued for 5 minutes and the scraping was repeated. After an additional 5 minutes of mixing, the blend was removed from the mixer. This preblend material was then passed through a 4 inch (10.16 cm.) Rietz disintegrator equipped with 0.117 cm. scuff screen and operated at 5,000 rpm. The Rietz blending was carried out twice. Moldings were made by preforming at 560 kg./cm.² followed by the SSG sintering cycle to measure tensile strength, tensile impact strength, and flexural creep modulus properties. For comparison purposes, a similar blend was made with a commercially available finely ground homopolymer molding powder meeting the requirements of ASTM class IV. Physical test results are shown in Table IV. It is evident from the table that copolymer molding powder of this invention combines a desirably higher flex creep modulus and higher tensile impact strength. While the copolymer molding powder shows appreciably lower ultimate strength in tension, its ultimate elongation is desirably higher. In addition, the copolymer shows appreciably lower unrecovered strain after the creep test.

Other fillers such as finely-divided graphite and powdered bronze or combinations of fillers may be incorporated into the modified resin in a manner similar to that described for the glass fibers.

TABLE IV

| | Copolymer Expt. Resin | Homopolymer |
|---|---|---|
| Tensile Strength, kg./cm.² | 186 | 240 |
| % Ultimate Elongation | 340 | 300 |
| Tensile Impact Strength kg. cm./cm.² | 343 | 188 |
| Flex Creep Mod. × 10⁻³ kg./cm.² | 4.5 | 2.7 |
| % Unrecovered Strain | 0.72 | 1.24 |

EXAMPLE 10

Seven polymerization runs were made in the 7.58 l. vertical autoclave. These runs were all conducted in a similar manner but with different concentrations of $CF_3(CF_2)_6COONH_4$ dispersing agent added at the start of polymerization in the 5 kg. water charge; with different amounts of PMVE added to give a range of PMVE contents; and with different amounts of ammonium persulfate (APS) initiator to control molecular weight in the usual manner. The runs contained ammonium carbonate buffer. Each was stirred at 65°C. while maintaining a pressure of 17.5 kg./cm.² with uninhibited tetrafluoroethylene for about an hour. Details of these experiments are shown in Table V.

For comparison a control run was made like run b with no added dispersing agent. The copolymers made with dispersing agent all had the desirably low amorphous content, fitting well the relationship shown for PPVE in the drawing. The data for the comparison polymer with no dispersing agent also fits well the curve for PPVE with no dispersing agent.

TABLE V

| | | Data for Examples with PMVE | | | |
|---|---|---|---|---|---|
| Run No | SSG | Wt. % PMVE | Wt. % Amorphous Content | Dispersing Agent-PPM | APS PPM |
| Control | 2.1504 | .051 | 9.6 | 0. | 225. |
| a | 2.1743 | .101 | 5.2 | 22. | 225. |
| b | 2.1697 | .078 | 5.8 | 80. | 225. |
| c | 2.1538 | .074 | 5.5 | 50. | 100. |
| d | 2.1798 | .064 | 5.8 | 80. | 225. |
| e | 2.1625 | .083 | 5.2 | 50. | 100. |
| f | 2.1458 | .166 | 6.7 | 50. | 100. |
| g | 2.1801 | .0 | 3.5 | 50. | 100. |

EXAMPLE 11

A stainless steel autoclave was charged with 22.7 kg. of water containing 20 g. of ammonium carbonate, 1.8 g. of ammonium perfluoro-caproate, and 2.0 g. of ammonium persulfate. The free space was evacuated and 10.0 ml. of perfluoro(propyl vinyl ether) was charged. The charge was pressured with tetrafluoroethylene to a pressure of 17.5 kg./cm.² gauge and the mixture was heated to 65°C. while being agitated at 600 rpm. with a four-blade agitator. The reaction was allowed to proceed with automatic addition of tetrafluoroethylene to maintain the pressure until 6.8 kg. of tetrafluoroethylene was converted to polymer. The pressure was reduced to atmospheric and the granular copolymer was separated from the slurry. The copolymer was added to demineralized water in a weight ratio of polymer to water = 1 to 50, cooled to 8°C. and passed through a Taylor-Stiles wet cutter equipped with a screen having 0.17 mm. hole diameter and 8 percent open space and with 15.2 cm. rotor running at 9600 rpm. The feed rate to the cutter was 22 kg. copolymer/hour. The resulting finely divided polymer was dried at 150°C. Characterization tests gave a specific melt viscosity of 0.11 poises at 380°C., a standard specific gravity of 2.1861, and an ultimate strength of 300 kg./cm.² and 465% ultimate elongation. The flexural creep modulus was 4000 kg./cm.² after 100 hours at 70 kg./cm.² stress. The perfluoro(propyl vinyl ether) concentration in the copolymer was 0.129 wt. % (0.0485 mole %) and the amorphous content was 6.5 % by wt.

EXAMPLE 12

Polymerizations were carried out in the equipment and according to the procedure of Example 1, except that the amonium carbonate buffer was eliminated. In these runs, the charge of PPVE was the same in each instance. The table shows the results of experiments with 5 and 10 ppm of added ammonium perfluorooctanoate. A control with no added dispersing agent is included in the table for comparison. The marked decrease in weight per cent amorphous for the polymerization even with as little as 5 ppm is clear.

| Dispersing Agent ppm | Ammonium Persulfate ppm | Time Min. | Weight % PPVE | Weight % Amorphous |
|---|---|---|---|---|
| 10 | 140 | 64 | .058 | 4.34 |
| 5 | 140 | 73 | .054 | 4.34 |
| 0 | 100 | 62 | .087 | 9.04 |

The relatively smaller ammonium persulfate initiator concentration in the zero dispersing agent run would not be expected to affect amorphous content; it did, however, give a slower polymerization rate which led to discontinuing the run at the formation of 15.2 weight % polymer solids as compared to 26.5 weight % for the dispersing agent runs. The copolymers of the dispersing agent runs had standard specific gravities of 2.1787 and 2.1785, respectively.

Another polymerization was carried out as described in Example 1 but using 16 ppm of the same dispersing agent. The copolymer contained 0.060 weight % of PPVE and had an amorphous content of 5.51% and a standard specific gravity of 2.160. It will be noted from the drawing that a copolymer of the same PPVE concentration but made without dispersing agent has an amorphous content of about 8.7% as read from curve 1 of the drawing.

COMPARATIVE EXAMPLE

A commercially available finely ground PTFE molding powder was analyzed and found by infrared anlaysis to contain 0.3 weight % (0.2 mole %) hexafluoropropylene. The standard specific gravity of this copolymer molding powder was 2.192, and the copolymer had an average particle size in the range of 20–30 microns, an apparent melt viscosity of $3.9 \times 10^9$ poises and an amorphous content of 7.2% in the powder as received. Tensile properties were determined on moldings made by the preform/free sinter technique using the procedure of ASTM D–1472–69 and the thermal cycle given above for standard specific gravity. Similar moldings were made from the molding powder of Example 11. The values are given in the table below. Another set of moldings was made except that the holding (sintering) period was 2 hours at 400°C. instead of one-half hour at 380°C. The specific gravity and tensile properties of these moldings are also included in the table. The deterioration in both tensile strength and ultimate elongation for the tetrafluoroethylene/hexafluoropropylene molding powder along with the increase in specific gravity (which reflects a gross decrease in molecular weight) shows the great sensitivity of this copolymer molding powder to thermal degradation relative to the product of this invention.

|  | Copolymer molding powder of Example 11 | Commercial Tetrafluoroethylene/ hexafluoropropylene Copolymer Molding Powder |
|---|---|---|
| SSG Cycle (hold 0.5 hr. at 380°C.) Tensile strength | 290 kg./cm.² [4130 psi] | 246 kg./cm.² [3500 psi] |
| Ultimate elongation, % | 500 | 400 |
| SSG | 2.186 | 2.192 |
| SSG Cycle but hold 2 hrs. at 400°C. Tensile strength | 228 kg./cm.² [3242 psi] | 109 kg./cm.² [1545 psi] |
| Ultimate elongation % | 424 | 112 |
| SSG | 2.189 | 2.216 |

Weight percent of hexafluoropropylene comonomer in the copolymer used in the above comparison example is determined by infrared analysis. The test specimen is prepared by pressing 1.75 g. of powder in a die 2.86 cm. in diameter at ambient temperature and a pressure of 700 kg./cm.² The infrared absorbance is recorded and a base line drawn tangent to the wings of the broad absorbance band. The ratio of the absorbance at 10.18 microns (982 cm.$^{-1}$) and 10.70 microns (935 cm.$^{-1}$) is determined. The weight percent of HFP is then determined from the ratio using the equation.

Weight percent HFP = $0.3 \times (A_{10.18}/A_{10.70})$

The factor 0.3 was obtained from material balance during polymerization.

As many apparently widely different embodiments of this invention may be made without departing from the spirit and scope thereof, it is to be understood that this invention is not limited to the specific embodiments thereof except as defined in the appended claims.

What is claimed is:

1. Polytetrafluoroethylene molding powder comprising a copolymer consisting of tetrafluoroethylene with from 0.02 to 0.26% by wt. of perfluoro(alkyl vinyl ether) wherein the alkyl group contains from 1 to 5 carbon atoms, said copolymer having an amorphous content no greater than 8% by weight, provided that when the vinyl ether content is between 0.02% and 0.18% by wt., the maximum amorphous content is calculated from the equation:

Wt. % Amorphous Content = $(18.4 \times$ wt. % vinyl ether$) + 4.6\%$.

2. The molding powder of claim 1 wherein the proportion of said perfluoro(alkyl vinyl ether) is from 0.03 to 0.16 % by wt.

3. The molding powder of claim 1 wherein said ether is perfluoro(propyl vinyl ether).

4. The molding powder of claim 1 wherein said amorphous content is no greater than 6.5% by wt.

5. In the process of polymerizing tetrafluoroethylene to polytetrafluoroethylene molding powder by pressuring tetrafluoroethylene into an agitated aqueous medium which contains perfluoro(alkyl vinyl ether), wherein the alkyl group contains from 1 to 5 carbon atoms, and dissolved free radical initiator, the improvement comprising conducting said polymerization in the presence of from 3 to 200 parts per million parts by weight of water present of telogenically inactive fluorinated dispersing agent, with the ether being present in an amount to produce a copolymer consisting of 0.02 to 0.26 wt. % of said ether with said tetrafluoroethylene.

* * * * *